Feb. 9, 1943.   P. L. NEWBOLD   2,310,540
CORN PLANTER
Filed March 20, 1941   2 Sheets-Sheet 1
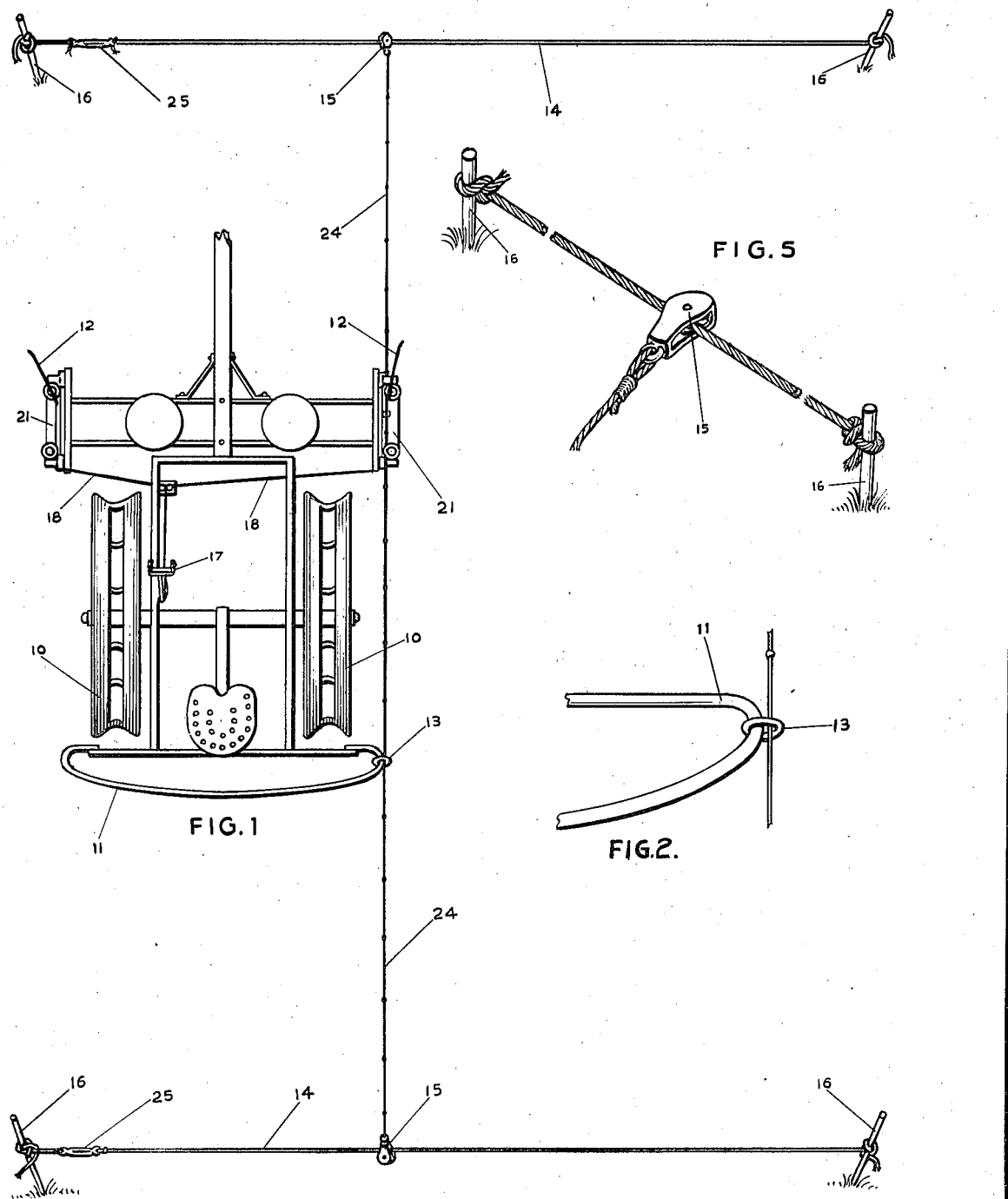
Inventor Feb. 9, 1943. P. L. NEWBOLD 2,310,540
CORN PLANTER
Filed March 20, 1941 2 Sheets-Sheet 2
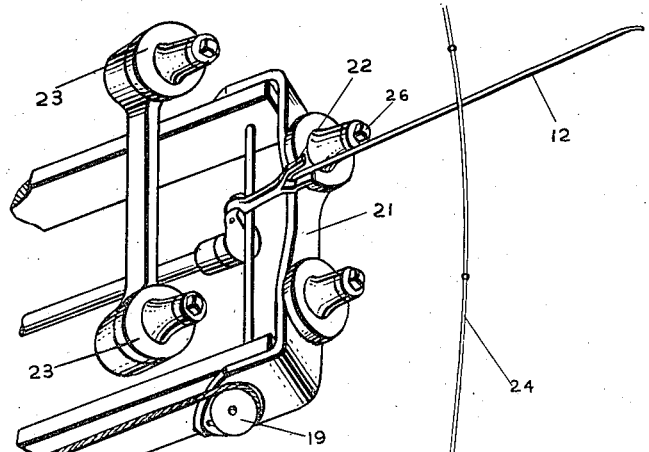
FIG. 4
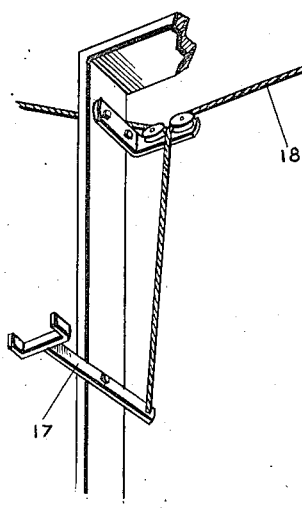
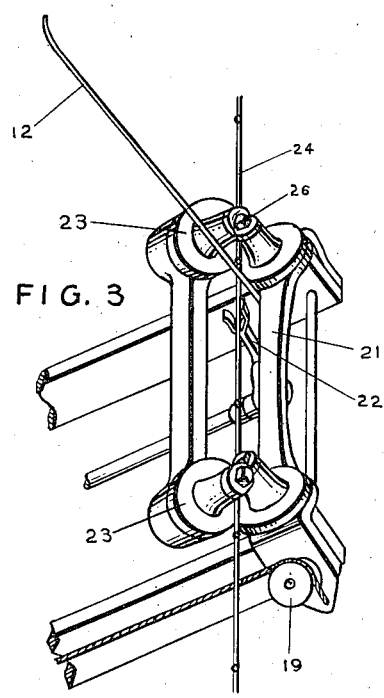
FIG. 3
FIG. 6
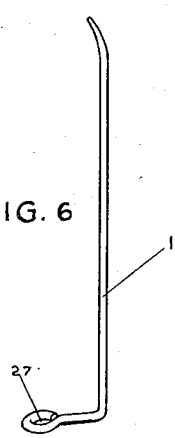
Inventor Patented Feb. 9, 1943

2,310,540

UNITED STATES PATENT OFFICE 2,310,540

CORN PLANTER

Park Lester Newbold, Cedar Rapids, Iowa

Application March 20, 1941, Serial No. 384,297

1 Claim. (Cl. 111—48)

This invention relates to corn planters and has particular relation to a planter and check row wire for planting corn or other seeds in hills.

One of the difficulties and time consuming operations of planting by the check row wire method is, (A) the necessity of the operator getting off and on the planter at the completion of each trip across the field, (B) disconnecting and reconnecting the wire by hand to the checking mechanism, (C) pulling from the ground the stake holding the check wire and moving it and wire over to the new position and reinserting into the ground.

Another of the difficulties is the inaccuracy of the cross check due to the loosening of the wire at each end and the subsequent different tautness of the wire upon reinserting the anchor stakes into the ground.

It is the object of my invention to provide an improved planter of simple and inexpensive construction that will eliminate the necessity of the operator alighting from the planter at the completion of each trip across the field.

Another object of my invention is to provide means to eliminate the necessity of disconnecting the check row wire from the planter at the completion of each trip across the field.

Another object of my invention is to provide means to permit turning at the end of the field without detaching the check wire from the planter.

Another object of my invention is to provide means to reinsert, without alighting, the check wire into the checking mechanism after the turning around has been completed.

Another object of my invention is to provide means for pulling the check row wire into the new position while turning around is being done.

Another object of my invention is to provide means to eliminate the necessity of moving by hand the check row wire into the new position at the completion of each trip across the field.

Another object of my invention is to provide means to eliminate the necessity of pulling the anchor stakes from the ground at the completion of each trip across the field.

Another object of my invention is to provide means for horizontal movement of the check row wire across the end of the field in relation to the movement of the planter.

Other and further features and objects of the invention will be more apparent to those skilled in the arts upon a consideration of the accompanying drawings and following specification, wherein is disclosed a single exemplary embodiment of the invention, with the understanding, however, that such changes may be made therein as fall within the scope of the appended claim, without departing from the spirit of the invention.

Figure 1 is a plan view of a planter constructed according to the several embodiments of my invention.

Figure 2 is a view illustrating particularly a section of the guide across the rear of the planter and the floating connection with the check wire.

Figure 3 is a view in perspective taken from another viewpoint and illustrating particularly the automatic inserting arm and wire holding mechanism in closed position.

Figure 4 is another view of the automatic inserting arm in the lowered or disconnected position and showing the means for raising or lowering it from the seat of the planter.

Figure 5 is a view of the anchor stakes and holding cable across the end of the field and pulley that holds the check row wire and rolls horizontally in relation to the movement of the planter.

Figure 6 is a view of the inserting arm disengaged from its normal position on the wire holding mechanism.

Referring now to the drawings the preferred embodiment of my invention includes a planter indicated generally at 10, a guide across the rear indicated at 11, automatic wire inserting arms at 12, floating check wire connection at 13, cables across the end of the field at 14, pulleys engaged to the check row wire 24, and moving horizontally in relation to the movement of the planter as planting progresses at 15, and anchor stakes at 16.

The automatic inserting arms 12 are operated by a pedal 17, connected by cables or other means 18, which cause both the right and left arms to raise or lower in unison. The cable 18 is passed over the roller 19 which is mounted on the pivot axis of the roller assembly 21, the end of the cable being fixed to a point on the roller assembly 21 spaced from the pivot axis so that a pull on the cable will impart a swinging movement of the roller assembly 21 with a corresponding raising of the arm 12. These arms 12 are attached to the lower wire holding roller assembly 21 by bolt 26 passed through eye 27 and their purpose is to act as levers and guides to raise and insert automatically the check row wire into the checking fork 22 and under the upper rollers 23.

In actual operation this action is necessary at each turning at the end of the field and is effected as follows. Upon reaching the end the operator of the planter 10 releases pedal 17 which drops arms 12 and releases check row wire 24 from holding assembly 21. The check row wire 24 is now disconnected from the front of the planter but is still engaged at the floating ring 13. The planter is turned around away from the check wire 24 which is being held about 12 inches above the ground by cables 14. As the turning around is completed the arm 12 next to the check wire 24 comes under the wire and the operator pushes the pedal 17 which raises the arms 12 automatically inserting the check wire 24 into checking fork 22 and wire holding assembly 21 and 23.

The guide across the rear of the planter as shown at 11 is for the purpose of permitting the planter 10 to turn around the end of the field without disconnecting the check row wire 24. The check wire is engaged to this by a floating snap ring 13 or other means, and in turning around to the new planting position the guide 11 moves through ring 13 to the opposite side and in doing so pulls the check row wire 24 into the new planting position by means of the pulleys 15 rolling on cables 14. The cables 14 are anchored securely at 16 a predetermined distance apart and are stretched taut by tightening buckles 25.

To avoid any difference in tautness of the check row wire 24 as planting progresses, caused by any give in the cables 14, the anchor 16 toward which one is approaching horizontally is set slightly outward producing a tightening action of the check wire 24 as it approaches the anchors 16 on the cables 14.

It is apparent that modifications of my invention may be made by those skilled in the art and such modifications may be made without departing from the spirit and scope of my invention as set forth in the appended claim.

I claim as my invention:

In combination, a check wire holding roller assembly movable about a pivot axis, a lever guide arm engaged thereto, a roller mounted on the pivot axis of the assembly, a cable passed over the roller and fixed to a point on the assembly spaced from the pivot axis so that a pull on the cable will impart a swinging movement of the roller assembly with a corresponding raising of the lever arm.

PARK LESTER NEWBOLD.